United States Patent [19]
Honda

[11] 4,081,783
[45] Mar. 28, 1978

[54] FISH FINDER CAPABLE OF DISCRIMINATING SIZES OF FISH

[76] Inventor: Keisuke Honda, 37, Shingashi-cho, Toyohashi, Aichi, Japan

[21] Appl. No.: 725,392

[22] Filed: Sep. 22, 1976

[30] Foreign Application Priority Data

| Sep. 26, 1975 | Japan | 50-115502 |
| Sep. 26, 1975 | Japan | 50-115503 |
| Nov. 5, 1975 | Japan | 50-132619 |
| Nov. 5, 1975 | Japan | 50-132620 |

[51] Int. Cl.$^2$ ............................................. G01S 9/70
[52] U.S. Cl. ................................... 340/3 R; 340/3 F
[58] Field of Search .............. 340/3 R, 3 F; 343/5 SA

[56] References Cited

U.S. PATENT DOCUMENTS

| 3,332,056 | 7/1967 | Drenkelfort | 340/3 R |
| 3,512,124 | 5/1970 | Watson | 340/3 R |
| 3,716,823 | 2/1973 | Thompson et al. | 340/3 R |

*Primary Examiner*—Richard A. Farley
*Attorney, Agent, or Firm*—Burgess, Ryan and Wayne

[57] ABSTRACT

The present invention discloses a fish finder wherein one transducer is used to generate both high- and low-frequency ultrasonic waves which are simultaneously emitted and the electrical signal representative of the reflected high- or low-frequency ultrasonic waves is extracted by the signal representative of the reflected low- or high-frequency ultrasonic waves, thereby discriminating the sizes of fish detected.

3 Claims, 10 Drawing Figures

FISH FINDER CAPABLE OF DISCRIMINATING SIZES OF FISH

BACKGROUND OF THE INVENTION

The present invention relates to a fish finder capable of detecting and discriminating only fish of a predetermined size.

In the past low-frequency fish finders have been used for detecting fish of relatively large size while high-frequency fish finders have been used for detecting fish of relatively small size such as whitebaits, shrimps and the like. However, the high-frequency fish finders can detect all of fish which the low-frequency fish finders can detect so that when the high-frequency fish finders are used for detecting small fish such as whitebaits or shrimps they also detect large fish such as sardines and mackerels and consequently cannot distinguish between large and small fish.

To overcome this problem, the same inventor devised a fish finder capable of detecting and distinguishing small fish such as shrimps, planktons, whitebaits and the like. This fish finder is disclosed in Japanese patent publication No. 40-25555. This fish finder includes two transducers capable of generating high- and low-frequency ultrasonic sound waves in response to the pulses from an oscillator and emitting them simultaneously. The high- and low-frequency echoes reflected back from the targets are converted into the electrical high- and low-frequency signals which are amplified and applied to an extractor circuit, where the signal components common in both the high- and low-frequency signals such as those representative of the bottom and the surface of the sea and individual and schools of fish of large size are extracted or eliminated from the high-frequency signal, whereby only small fish may be detected and distinguished.

The fish finder of the type described must emit the high- and low-frequency ultrasonic sound waves at the same beam angle. However when a school of small fish is dense, the low-frequency ultrasonic sound waves reflected by this school have a relatively high level. Therefore when the high-frequency signal is extracted or eliminated by the low-frequency signal, the signal component representative of this relatively dense school of small fish is extracted or eliminated so that small fish cannot be detected. Furthermore two transducers must be provided for generating high- and low-frequency ultrasonic sound waves, and they are large in size because they must emit the high- and low-frequency ultrasonic sound waves at the same beam angle.

SUMMARY OF THE INVENTION

In view of the above, one of the objects of the present invention is to provide a fish finder which may distinctly detect individual and schools of fish of a predetermined size.

Another object of the present invention is to provide a fish finder incorporating a single transducer capable of generating both high- and low-frequency ultrasonic sound waves simultaneously.

Briefly stated, to the above and other ends the present invention provides a fish finder comprising a single transducer capable of generating high- and low-frequency ultrasonic sound waves simultaneously and emitting them into the sea simultaneously, receivers for receiving the echoes of high- and low-frequency ultrasonic sound waves reflected back from the targets and intercepted by said transducer, an extractor circuit for extracting from one of the high- and low-frequency output signals from said receivers the signal components common in both said high- and low-frequency signals, and a recorder for recording the output from said extractor circuit.

DESCRIPTION OF THE PREFERRED EMBODIMENT

Figure 1:
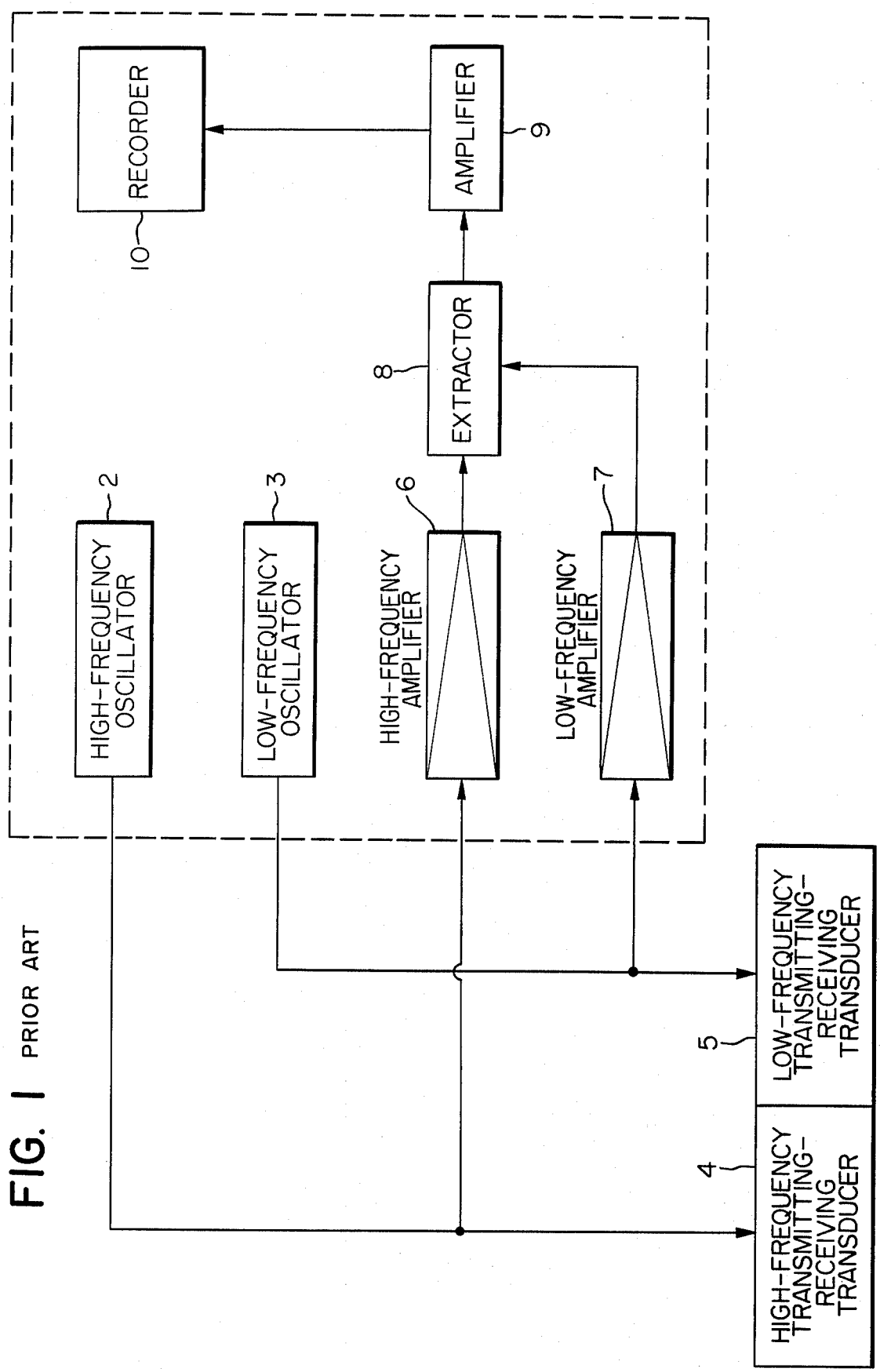
FIG. 1 is a block diagram of a prior art fish finder devised by the same inventor.

Prior to the description of the preferred embodiments of the present invention, the fish finder which was devised by the same inventor will be described briefly with reference to FIG. 1 in order to point out distinctly and specifically the problems thereof. In FIG. 1, reference numeral 1 denotes a fish finder; 2, a high-frequency oscillator; 3, a low-frequency oscillator; 4, a high-frequency transmitting-receiving transducer; 5, a low-frequency transmitting-receiving transducer; 6, a high-frequency amplifier; 7, a low-frequency amplifier; 8, an extractor; and 9, an amplifier for amplifying the signal to be applied to a recorder 10.

In operation, the high- and low-frequency pulses generated by the high- and low-frequency oscillators 2 and 3 are simultaneously applied to the transmitting-receiving transducers 4 and 5, respectively, so that the latter emit ultrasonic sound waves into the sea. The echoes are received by both the transducers 4 and 5 and the outputs therefrom are amplified by the amplifiers 6 and 7. The outputs from the amplifiers 6 and 7 are applied to the extractor, where the output from the low-frequency amplifier 7 is extracted from the output from the high-frequency amplifier 6 so that undesired reflecting targets such as bubbles produced by the waves and fish of large size may be extracted from the output from the high-frequency amplifier 6. The output from the extractor 8 is amplified by the amplifier 9 and recorded by the recorder 10.

The extractor 8 may be a conventional amplifier which suppresses its output in response to the output from the low-frequency amplifier 7 which is higher than a predetermined level. Therefore the extractor 8 may be a conventional differential amplifier.

The fish finder of the type described has some problems. Firstly, two transducers are required for emitting and receiving the high- and low-frequency ultrasonic sound waves. Secondly, they must have the same directivity or the same beam angle so that they are large in size.

Figure 2:
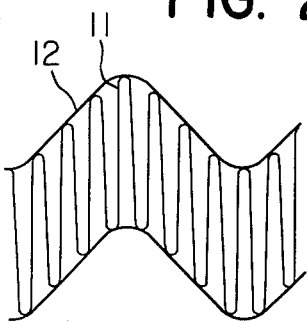
FIG. 2 shows the high- and low-frequency ultrasonic sound waves generated by a single transducer used in the present invention.

Underlying Principle, FIG. 2

The present invention utilizes a transducer which as shown in FIG. 2 vibrates in the direction of thickness to generate the high frequency ultrasonic waves 11 and vibrates in the radial direction to produce the low-frequency ultrasonic waves 12.

Figure 3:
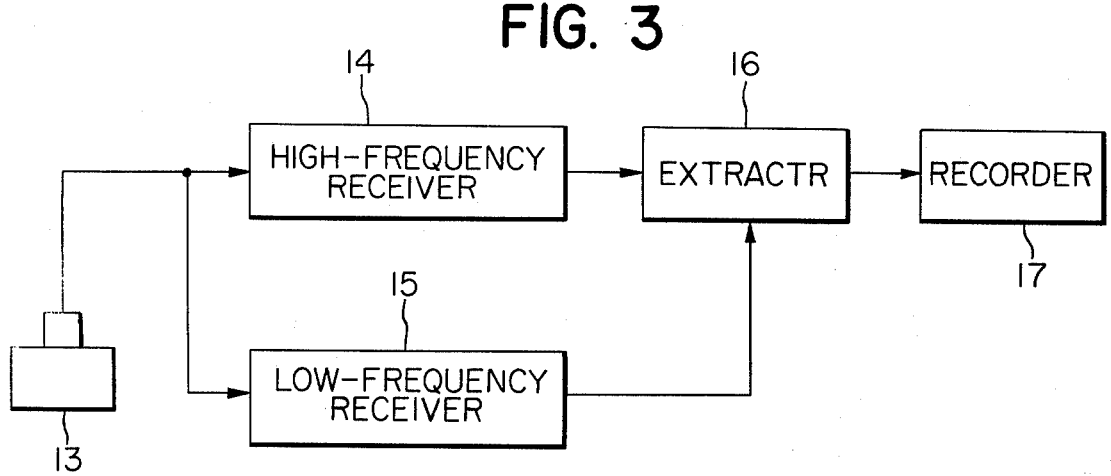
FIG. 3 is a block diagram of a first embodiment of the present invention.

First Embodiment, FIG. 3

In FIG. 3 there is shown a block diagram of a first embodiment of a fish finder incorporating the transducer of the type described. In the figure, reference numeral 13 denotes a transducer; 14, a high-frequency receiver; 15, a low-frequency receiver; 16, an extractor; and 17, a recorder.

When the signal of a predetermined high frequency is applied to the transducer 13, it vibrates in the direction of thickness to generate the high-frequency ultrasonic waves, and when the signal of a predetermined low-frequency is applied, it vibrates in the radial direction to generate the low-frequency ultrasonic waves. The emitted ultrasonic waves are reflected by reflecting targets such as the bottom and surface of the sea and individual and schools of fish and then intercepted by the transducer 13. The output from the transducer 13 is applied to the high- and low-frequency receivers 14 and 15, and the outputs therefrom are applied to the extractor 16. When the output from the high-frequency receiver 14 is controlled, the signal components in common with those included in the output from the low-frequency receiver 15 may be eliminated. These common signal components include those representative of the bottom and surface of the sea in addition to those representative of individual and schools of fish of relatively large in size so that there arises a problem that the signal components representative of the bottom and surface may be lost. However, in practice the high-frequency echo reflected back from the bottom and the surface arrives at the transducer 13 later than the low-frequency echo reflected back from the bottom and the surface does so that the output from the high-frequency amplifier 14 includes the signals representative of the echo from the bottom and surface of the sea, which will not be extracted.

As described above, whereas the prior fish finder uses two transducers for generating the high- and low-frequency ultrasonic waves, the present invention ultilizes only one transducer which vibrates in both the direction of thickness and the radial direction to generate the high- and low-frequency ultrasonic sound waves simultaneously. Therefore the fish finder in accordance with the present invention may be made compact in size, light in weight, simple in assembly and inexpensive to manufacture.

Figure 4:
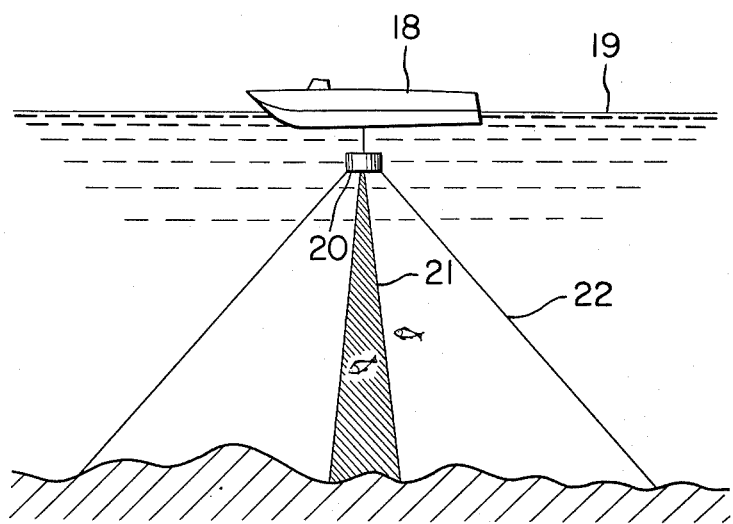
FIG. 4 is a diagram used for the explanation of a second and a third embodiments of the present invention.

Second Embodiment, FIG. 4

In the first embodiment, the high- and low-frequency ultrasonic beams have been described as being emitted at the same beam angle, but in the second embodiment, a transducer 20 suspended from a fishing boat 18 emits the high-frequency ultrasonic sound waves 21 at a relatively small beam angle and emits the low-frequency ultrasonic sound waves 22 at a relatively wide beam angle. Therefore the echo of high frequency ultrasonic sound waves reflected back from a school of fish of small size has a high level, but is not extracted because firstly the low-frequency ultrasonic sound waves 22 are emitted with a wide beam angle and secondly the echo reflected back from a school of fish small in size is naturally low in level. However, the echo of low-frequency ultrasonic waves reflected back from individual and a school of fish of large size and received by the transducer 20 has the level substantially equal to the level of the echo of high-frequency ultrasonic sound waves so that the former is extracted or eliminated and consequently the school of fish of small size is recorded. Therefore the second embodiment has a synergistic effect of the difference in sensitivity to small fish depending upon the beam angle combined with the difference in sensitivity to small fish depending upon the frequency of the ultrasonic sound waves so that small fish may be very clearly detected and recorded.

Figure 5:
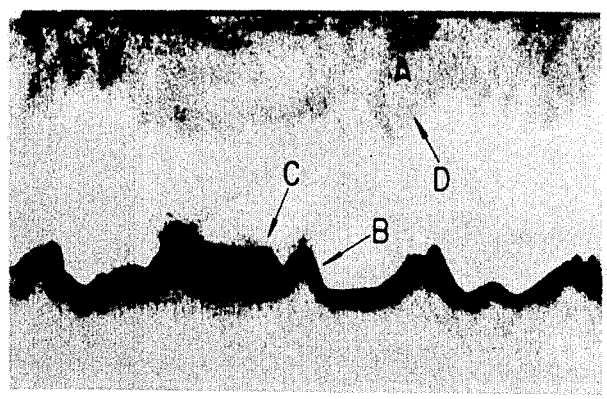
FIG. 5 shows a picture of the record taken by the conventional fish finder using only high frequency ultrasonic sound wave.
Figure 6:
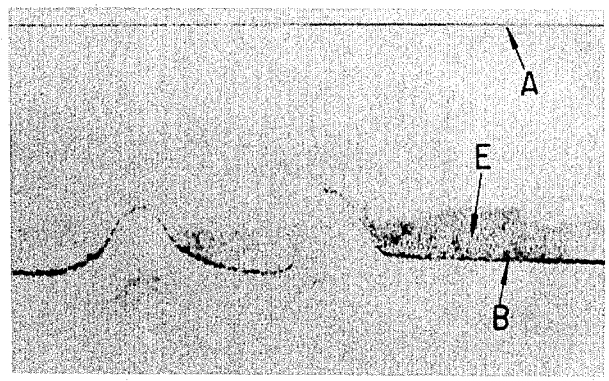
FIG. 6 is a picture of the record taken by the fish finder in accordance with the present invention.

The superiority of the fish finder in accordance with the present invention over the conventional fish finder is apparent from FIGS. 5 and 6 showing the pictures of the records made by them. FIG. 5 shows the picture of the record made by the conventional fish finder using only high-frequency ultrasonic sound, and A denotes the surface; B, the bottom; C, a school of fish; and D, small fish or bubbles. It is difficult to distinguish between the bottom B and the school of fish C and between the small fish and bubbles. FIG. 6 shows the picture of the record by the fish finder in accordance with the present invention. It is seen that small fish (small shrimps swimming closer to the bottom) is clearly indicated and that except the bottom, fish of large size and bubbles are not recorded at all. Thus the second embodiment may provide a very clear and sharp recording.

Third Embodiment, FIG. 7

Figure 7A:
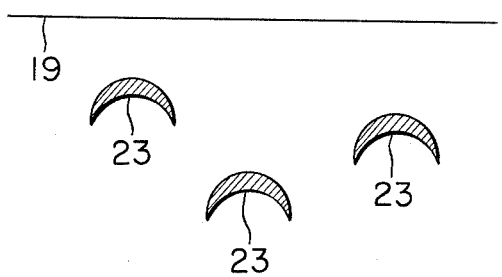
FIGS. 7(a), 7(b) and 7(c) are views used for the explanation of the third embodiment.
Figure 7B:
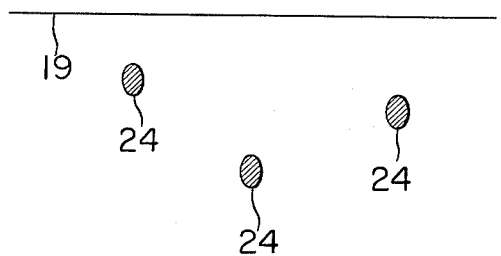
Figure 7C:
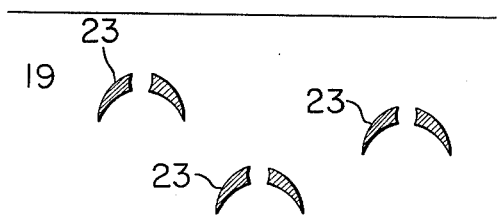

Whereas the second embodiment emits the high-frequency ultrasonic sound waves at a small beam angle and the low-frequency ultrasonic sound waves with a wide beam angle, the third embodiment emits two ultrasonic sound waves of the same frequency with wide and narrow beam angles. More particularly, the transducer 20 suspended from the boat 18 emits the first ultrasonic waves 21 with a narrow beam angle and the second ultrasonic sound waves 22 with a wide beam angle. Then, as shown in FIG. 7(a), the echo of the second waves with a wide beam angle reflected back from a fish of large size is recorded in the form of a crescent while the echo of the first waves with a narrow beam angle reflected back from a small fish is recorded in the form of a comet 24 as shown in FIG. 7(b). When the signal representative of the first waves with a narrow beam angle is extracted by the extractor from the signal representative of the second waves with a wide angle, the crescent-like image of a large fish is broken into two pieces or the center portion of the crescent-like image is extracted as shown in FIG. 7(c). That is, the images of bubbles, small fishes and planktons are eliminated so that only fishes of large size may be clearly displayed.

Figure 8:
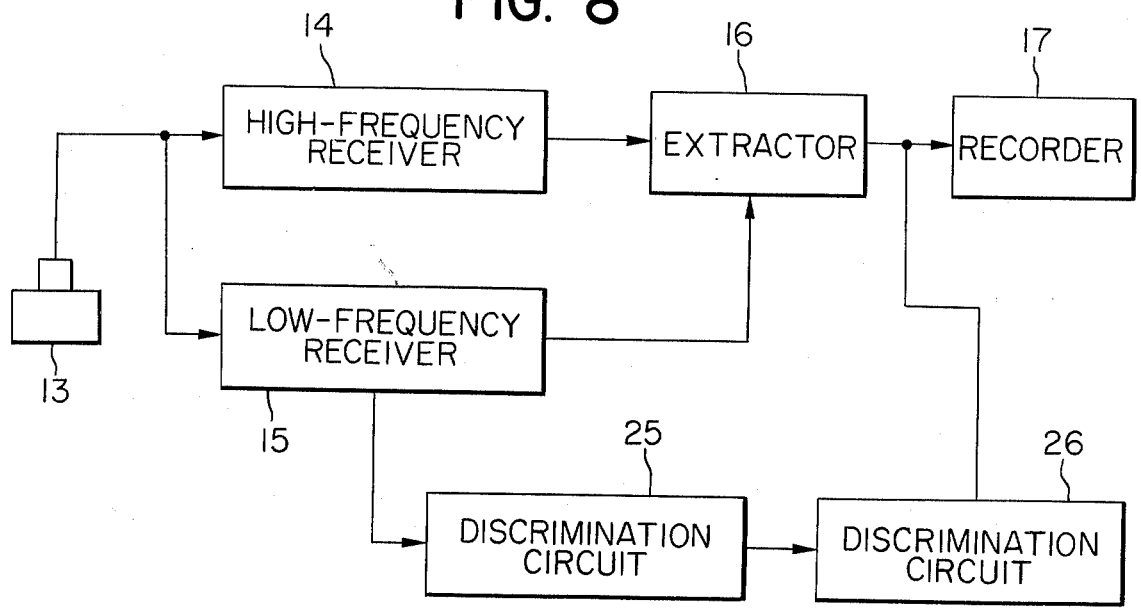
FIG. 8 is a block diagram of a fourth embodiment of the present invention.

Fourth Embodiment, Fig. 8

The first, second and third embodiments described above are common in that one crystal resonator is used to generate two sound waves of different frequency which are simultaneously emitted at different beam angles and then received by the transducer and the signal components which are common in both the high- and low-frequency echoes are extracted from the high-frequency echo. Therefore they have a common defect that the signal representative of the bottom is extracted from the high-frequency output signal because the echo of the low-frequency ultrasonic sound waves reflected back from the bottom becomes longer than the echo of the high-frequency sound waves reflected from the bottom, especially from the slopes of the bottom.

The fourth embodiment was made to overcome this problem. For this purpose, the fourth embodiment utilizes the phenomenon that the echo from the bottom is considerably stronger than the echoes reflected by individual and schools of fish, and provides a fish finder wherein the signal of high- or low-frequency higher than a predetermined level is differentiated and added to the high-frequency signal.

In FIG. 8 there is shown a block diagram of the fourth embodiment of the present invention comprising, in addition to the components 13 through 17 of the first embodiment, a level discrimination circuit 25 and a differentiator circuit 26. In operation, as with the case of the first embodiment, the high- and low-frequency ultrasonic sound waves are emitted into the sea from the transducer 13, reflected by the bottom and surface of the sea and schools of fish and received by the transducer 13. The outputs from the transducer 13 are applied to the receivers 14 and 15, and the output from the receiver 15 is applied to the extractor 16. The extractor 16 controls the output from the receiver 14 so that the common signal components representative of such reflecting targets as the bottom and surface of the sea and schools of fish of large size are extracted from the output from the receiver 14. The low-frequency signal arrives at the receiver 15 faster than the high-frequency signal arrives at the receiver 14 so that the output from the latter includes the signal component representative of the bottom which is recorded by the recorder 17. However, in some cases, the low-frequency signal applied to the input of the receiver 15 is longer than the high frequency output signal from the receiver 14 because of the difference in beam angle between the high- and low-frequency ultrasonic sound waves emitted. This phenomenon is pronounced especially when the bottom is sloped. As described above the echo from the bottom is considerably higher in level than the echoes from individual and schools of fish. Therefore the output from the receiver 15 is applied to the level discrimination circuit 25 so that the signal above a predetermined level is differentiated by the differentiator circuit 26 and added to the output from the extractor 16 and recorded by the recorder 17.

Therefore even when the signal representative of the bottom should be eliminated from the output from the receiver 14, the output from the differentiator circuit 26 is added so that the bottom image is recorded without fail.

I claim:

1. A fish finder capable of discriminating the sizes of fish, comprising:
    a single transducer capable of transmitting and receiving high- and low-frequency ultrasonic sound waves simultaneously, one of said high- and low-frequency ultrasonic sound waves being emitted with a wide beam angle while the other of said waves is emitted with a narrow beam angle;
    receivers for processing the high- and low-frequency echo signals received by said transducer,
    a subtractor circuit for subtracting the received echo signal corresponding to the narrow beam angle from the received echo signal corresponding to the wide beam angle, and
    a recorder for recording the output from said subtractor circuit comprising echo signals corresponding to images of fish of desired size.

2. A fish finder as set forth in claim 1 wherein the high-frequency ultrasonic sound waves are emitted at a narrow beam angle while the low-frequency ultrasonic waves are emitted at a wide beam angle; and the reflected low-frequency ultrasonic sound waves are subtracted from the reflected high-frequency ultrasonic sound waves, thereby discriminating individual fish and schools of fish of small size.

3. A fish finder capable of discriminating the sizes of fish, comprising:
    a single transducer capable of transmitting and receiving high- and low-frequency ultrasonic sound waves simultaneously,
    receivers for processing the high- and low-frequency signals received by said transducer,
    a subtractor circuit for subtracting one of said received high- and low-frequency signals from the other of said signals,
    means for determining when the received low-frequency signal has an amplitude exceeding a predetermined threshold value, and for thereupon detecting and differentiating said received signal and adding the resulting detected and differentiated signal to the output of the subtractor circuit to provide a signal enhancing the sea bottom, and
    a recorder for recording said enhanced signal.

* * * * *

UNITED STATES PATENT OFFICE
CERTIFICATE OF CORRECTION

Patent No. 4,081,783      Dated March 28, 1978

Inventor(s) Keisuke Honda

It is certified that error appears in the above-identified patent and that said Letters Patent are hereby corrected as shown below:

In Figure 3, element 16 (in both the Abstract page and the sheet of drawing: "EXTRACTR" should be --EXTRACTOR--.

Signed and Sealed this

Twenty-first Day of November 1978

[SEAL]

Attest:

RUTH C. MASON
*Attesting Officer*

DONALD W. BANNER
*Commissioner of Patents and Trademarks*